United States Patent [19]
Abdelmalek

[11] Patent Number: 5,351,487
[45] Date of Patent: Oct. 4, 1994

[54] HIGH EFFICIENCY NATURAL GAS ENGINE DRIVEN COOLING SYSTEM

[76] Inventor: Fawzy T. Abdelmalek, 12807 Willowyck Dr., St. Louis, Mo. 63146

[21] Appl. No.: 944,537

[22] Filed: Sep. 14, 1992

Related U.S. Application Data

[63] Continuation-in-part of Ser. No. 887,876, May 26, 1992, Pat. No. 5,327,987.

[51] Int. Cl.$^5$ .............................................. F01K 23/10
[52] U.S. Cl. ....................................................... 60/618
[58] Field of Search ........................................... 60/618

[56] References Cited

U.S. PATENT DOCUMENTS

| | | | |
|---|---|---|---|
| 4,031,705 | 6/1977 | Berg | 60/618 |
| 4,996,845 | 3/1991 | Kim | 60/618 |
| 5,000,003 | 3/1991 | Wicks | 60/618 |

FOREIGN PATENT DOCUMENTS

| | | | |
|---|---|---|---|
| 2459886 | 2/1981 | France | 60/618 |
| 52-14153 | 2/1977 | Japan | 60/618 |
| 2033017 | 5/1980 | United Kingdom | 60/618 |

*Primary Examiner*—Richard A. Bertsch
*Assistant Examiner*—Charles G. Freay

[57] ABSTRACT

A method for recovering and utilizing residual waste heat energy normally rejected into the atmosphere from a combined direct expansion refrigeration system driven by a natural gas or internal combustion engine, wherein the waste heat energy rejected from the condenser of the refrigeration system is combined with the heat energy rejected from the engine block cooling fluid and the exhaust gas stream and recovered by a refrigerant power fluid to drive a vapor power expander and co-generate auxiliary electric power.

2 Claims, 2 Drawing Sheets

HIGH EFFICIENCY NATURAL GAS ENGINE DRIVEN COOLING SYSTEM

RELATIONSHIP TO OTHER PENDING APPLICATIONS

This application constitutes a continuation-in-part of my copending application Ser. No. 07/887,876 filed May 26, 1992, now U.S. Pat. No. 5,327,987.

BACKGROUND OF THE INVENTION

1. Field of the Invention

The present invention relates generally to a high efficiency gas engine driven cooling system, and more particularly to a liquid chiller, or an air cooling system, driven by a gas fueled internal combustion engine, and having means to recover the waste heat energy usually rejected into the atmosphere from the refrigeration heat cycle, and from the internal combustion heat cycle, to produce useful electric power.

The generated electric power is transmitted to drive the auxiliary pumps, fans, and controls of the cooling system, thus reducing the energy needed, and increasing the fuel utilization.

1. Description of Prior Art

The continuing increases in the cost of fossil fuel, and the increased environmental concerns, have forced global attention on a variety of energy conserving, and waste energy based co-generation technologies.

In the U.S. electric power utility generation peaks during the summer months. Refrigeration, and air cooling systems accounts to more than 40 percent of the electric power daily demand, and approximately 25 percent of the peak demand comes from commercial cooling. The increased charges for the electric use during summer peak demand period is a major issue when making purchase decisions of cooling systems, and has driven the user to reducing the electric peak demand by using absorption cooling, natural gas engine driven cooling, and by co-generation. Many electric utility companies offer incentives to encourage reducing the electric power use during peak demand periods, to avoid very expensive expansions of its utility power plants, and its electric power distribution facilities. Electric and natural gas utility companies recognize that natural gas driven cooling is an important available alternative to effectively decrease the electric power demand, and to contribute to a cleaner environment. Although the first costs are higher for natural gas driven cooling systems, operating cost are significantly lower, and the increased savings from reduced operating costs can pay back the first cost premium in a very short period, and will deliver a reasonable return on the capital investment.

Publications of the Gas Research Institute (GRI) highlighted a growing commercial market in the U.S. for the natural gas engine driven cooling systems, these systems came to the market in 1989, and are commercially available or under development for capacities starting from 15 ton for small roof top units installations, and up to 500 ton liquid chillers for central cooling systems for large building complexes, and industrial applications.

Gas engine driven cooling systems, may be equipped with an automotive derivative engine coupled to a refrigerant gas compressor, the compressor may be of a rotary, helical screw, scroll, centrifugal, or reciprocating type. The inherent variable speed capability of the gas engine drive, provides high efficiency compression over a wide range of cooling loads.

The theory and practice of combined cycle engines are well known for recovering and utilizing heat from liquid cooled internal combustion engines to produce auxiliary power using Rankine Cycle vapor driven turbine or expander. U.S. Pat. No. 4,031,705 by Berg, disclosed an auxiliary power vapor or hot gas engine coupled to an internal combustion engine for generating vapor in one or more heat exchanger to drive a vapor engine.

U.S. Pat. No. 4,996,845 by Kim, disclosed a cooling, heating and power generating device utilizing waste heat from an automobile engine to produce auxiliary energy source for driving various accessories such as cooling/heating apparatus. U.S. Pat. No. 5,000,003 by Wicks disclosed a combined internal combustion engine, and a power vapor turbine or expander to recover virtually all the internal combustion engine heat normally rejected through the engine coolant radiator and through the engine exhaust to generate auxiliary power and provide very substantial fuel efficiency.

It is noted that the prior art work do not suggest an internal combustion engine driven fluid chiller or cooling system wherein the heat energy rejected in the refrigerant condenser is recovered and combined with the heat rejected from the internal combustion engine cooling fluid and from the exhaust gas stream and recovered by another refrigerant power fluid to drive an auxiliary power vapor expander, and achieve a very high utilization of fuel for refrigeration or cooling. In addition to the well known environmental benefits of achieving a higher fuel utilization, the present invention shall provide a very high return on the investment, for example the energy savings from operating a 100 ton gas engine driven fluid chiller system utilizing the present invention when compared to a direct electric driven fluid chiller system, will provide less than two year payback on the investment needed for the improvements described herein.

The present invention is related to my previous U.S. Pat. No. 5,136,854, which disclosed a process for conserving the waste energy usually rejected from the vapor compression refrigeration heat cycle, and also related to my previous U.S. co-pending application Ser. No. 07/887,876 which discloses a process for conserving the waste energy usually rejected from a automotive internal combustion engine heat cycle. However these prior disclosures did not suggest individually, or integrally the system combination of embodiments and details as disclosed in the present invention.

It is therefore, a principle object of the present invention to increase the Energy Efficiency Ratio (EER) of a gas engine driven cooling system.

It is further, a principle object of the present invention to provide an energy recovery system for a gas engine driven cooling system, utilizing the waste heat usually rejected from the engine cooling fluid, and from the exhaust gas stream, to co-generate useful electric power.

It is further, a principle object of the present invention to provide an energy recovery system, utilizing the waste heat usually rejected from the condenser of a refrigerant direct expansion cooling system, to co-generate useful electric power.

It is further, an object of the present invention to provide a natural gas engine driven cooling system, which conserves energy, and reduces the pollution impact on the environment.

It is further, an object of the present invention, to reduce the electric power use during the peak demand periods, to avoid the expensive expansions of the power generation and distribution facilities of the electric power utilities.

These objects, and others which will become apparent from the following detailed descriptions and drawings, are fulfilled by incorporating a heat exchange system to recover the waste heat energy, usually rejected from; (1) the condenser of a refrigerant direct expansion cooling cycle; and (2) from the internal combustion engine block and exhaust manifold, to operate a gas expander-electric generation unit, convert the waste heat energy to Kinetic energy, and to co-generate useful electric power.

While the present invention has particular usefulness in connection with a gas engine driven cooling system, the invented system can be employed with other gasoline, or diesel fueled internal combustion engines for many applications. The invented energy recovery, and electric power co-generation system, may be added to an existing installation, without the need to modify the basic design of the internal combustion engine.

SUMMARY OF THE INVENTION

In accordance with the present invention, a natural gas engine driven cooling system, has its power shaft connected to a refrigerant vapor compressor, and has an electric power co-generation system, which utilizes the waste heat energy rejected from the condenser of the direct expansion refrigeration cycle, and from the internal combustion engine heat cycle.

Depending on the ambient temperatures, and the operating conditions of the cooling system, approximately 0.5 to 0.75 Kilowatt of electric power will be co-generated for each ton (12,000 Btu/hr) of the cooling capacity. It is apparent that the application of this invention when compared to the prior art, will result in a dramatic reduction in the costs of electric power purchase during the peak demand periods, and will substantially reduce the operating costs of commercial cooling systems.

DETAILED DESCRIPTION OF THE PRESENT INVENTION

In the present invention, the waste heat energy rejected from a gas engine driven cooling system is recovered, and utilized to co-generate useful electric power. A heat exchange system reclaims the waste heat energy by employing an evaporative power fluid contained in a closed power circuit. The waste heat energy is recovered from three heat rejection steps; first, at the condenser of the refrigerant direct expansion cooling cycle; secondly, at the internal combustion engine block; and thirdly, at the internal combustion engine exhaust gas manifold.

In the first step, the waste heat energy rejected from the condenser of the cooling system is utilized to heat, and partially evaporate the power fluid, while the hot gas refrigerant of the cooling system is desuperheated, and condensed, the power fluid is heated and evaporated.

In the second step, the residual heat of combustion in the internal combustion engine block is removed by the engine cooling fluid, while the hot engine block is cooled to a relatively lower temperature, the cooling fluid is heated to a relatively higher temperature. In the third step, the relatively hot cooling fluid flowing from the engine block is directed to a heat exchanger placed in the exhaust gas stream to reclaim its heat energy, while the hot exhaust gas stream is cooled to a relatively lower temperature, the warm cooling fluid is further heated to a relatively higher temperature. The heat energy removed by the engine cooling fluid from step 2 and step 3, is then exchanged with the evaporative power fluid flowing from the condenser (step 1) of the cooling system, while the relatively hot engine cooling fluid is cooled, the warm evaporative power fluid is heated and evaporated to a superheat condition. The superheated high pressure vapor of the power fluid is then released to expand through a gas expander to drive an electric power generator. When the relatively high pressure, relatively high temperature vapor of the power fluid expands through the power expander, its internal energy is removed in the form of "WORK"; (1) provides Kinetic energy needed to drive the rotor of the electric generator, and produce electric power; (2) provides the cooling effect needed to condense the refrigeration fluid of the cooling system, and to cool the cooling fluid of the internal combustion engine. The relatively lower pressure, relatively lower temperature saturated vapor of the power fluid, is then directed to a condenser, where its latent heat is removed and rejected into the atmosphere. The condensate of the power fluid is then returned back by a liquid pump to the high pressure side of the closed power circuit.

OPERATION

Figure 1:
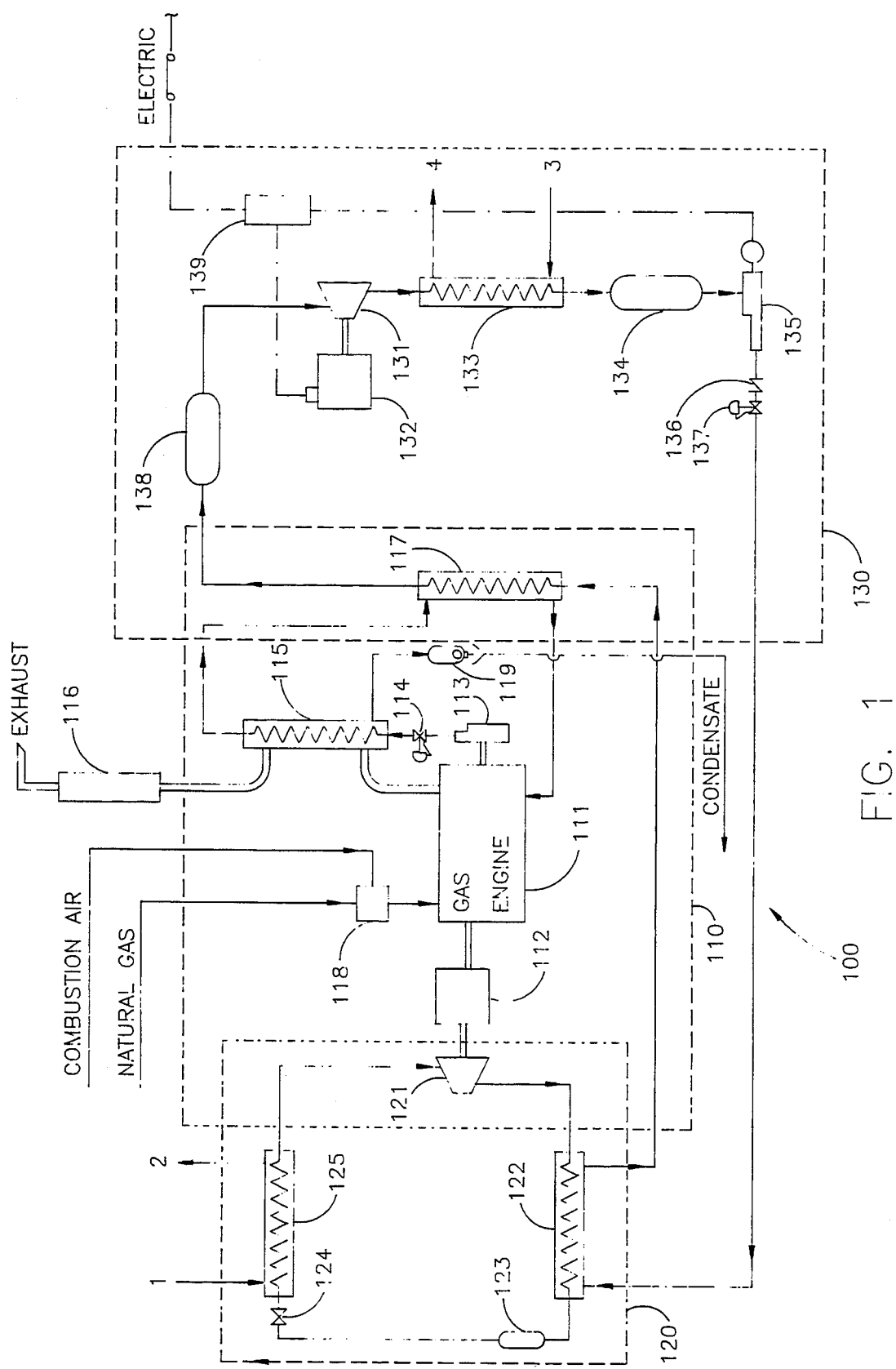
FIG. 1 is a schematic drawing for a natural gas engine driven liquid chiller system.

FIG. 1 indicates a schematic diagram for a gas engine driven liquid chiller system 100. System 100 has a natural gas fueled internal combustion engine system 110, a refrigerant vapor compression, direct expansion liquid chiller system 120, and a waste energy driven co-generation electric power system 130.

The internal combustion engine system 110, consists of an automotive derivative gas engine 111, having a power transmission drive 112, recirculating cooling fluid pump 113, cooling fluid flow control valve 114, engine exhaust gas cooler 115, an exhaust pipe 116, engine cooling fluid cooler 117, combustion air-fuel mix controller 118, and exhaust water vapor condensate drain valve 119.

The refrigerant vapor compression, direct expansion liquid chiller system 120, consists of a gas compressor 121, directly driven by the gas engine 111, a refrigerant condenser 122, a refrigerant liquid accumulator filter 123, a direct expansion valve 124, and an evaporator 125. The heat load from the refrigeration fluid rejected in condenser 122 is exchanged to affect heating and evaporating a power fluid employed for the electric power co-generation system 130. The heat load of a building or alike, is removed in the evaporator 125 by a circulating chilled water system (not shown), having pipe connections 1 and 2.

The electric power co-generation system 130, consists of a power gas expander 131, employed to produce kinetic energy upon the expansion of the vapor of a power fluid, to a relatively lower pressure and lower temperature levels. The expanded vapor flowing from the expander then enters a condenser 133, where its residual latent heat is removed by a recirculating cooling water system (not shown), having connections 3 and 4. The condensate of the power fluid is then received in a liquid receiver accumulator 134, and recirculated back to the high pressure side of the power cycle through the liquid pump 135. The pressurized liquid of the power fluid is then directed through a non-return valve 136, and a pressure regulating valve 137 to enter the refrigerant condenser 122. The undesirable building heat load is removed by the power fluid, while the hot gas of the refrigeration fluid is desuperheated and condensed, the liquid power fluid is heated and evaporated. The heated power fluid flowing from the condenser 122 is then directed to enter the engine fluid cooler 117. The heat of the engine block and the exhaust gases which are removed by the engine cooling fluid are exchanged with the power fluid, while the engine hot cooling fluid is cooled, the already heated power fluid flowing from the condenser 122, is further heated, and evaporated to a superheated state. The superheated high pressure vapor of the power fluid then enters a high pressure gas accumulator 138, and is then released to drive the power gas expander 131. The power gas expander 131 is mechanically connected to a permanent magnet, direct current generator 132. The direct current electric power produced by the generator 132, is then transmitted in the electric wiring to a control panel 139. The control panel 139 includes a solid state voltage regulator, and a frequency inverter, to deliver the required electric power characteristics. The electric control circuit shall start-up the gas expander rotor upon reaching pre-set levels of pressure and temperature of the power fluid, other temperature, flow detection, and pressure, sensing and control devices, are fitted in the system, to provide protection against excessive pressures and temperatures. The exhaust gas cooler 115, must be constructed of corrosion resistant materials to withstand the acidic water vapor condensate.

Figure 2:
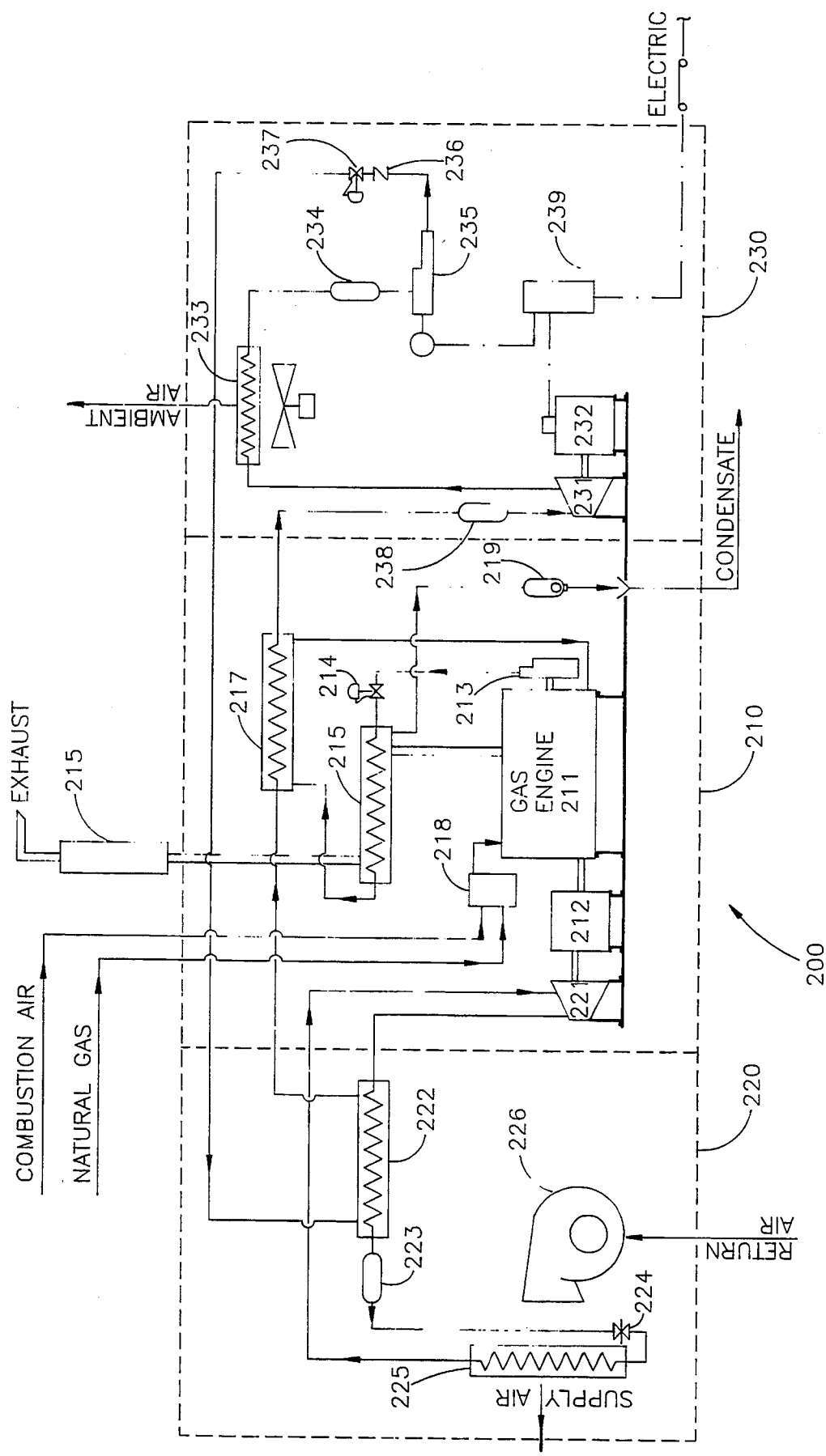
FIG. 2 is a schematic drawing for a natural gas engine driven direct expansion air cooling system.

FIG. 2 indicates a schematic drawing for a gas engine driven packaged air conditioning system 200. System 200 has a natural gas fueled internal combustion engine system 210, a refrigerant vapor compression, direct expansion air cooling system 220, and a waste energy driven co-generation electric power system 230.

The internal combustion engine system 210, consists of an automotive derivative gas engine 211, having a power drive transmission 212, cooling fluid pump 213, cooling fluid flow control valve 214, engine exhaust gas cooler 215, combustion air-fuel mix controller 218, and exhaust water vapor condensate drain valve 219.

The refrigerant vapor compression, direct expansion air conditioning system 220, consists of a gas compressor 221, directly driven by the gas engine drive 212, a refrigerant condenser 222, a refrigerant liquid accumulator filter 223, a direct expansion valve 224, and an evaporator 225. The heat load from the refrigeration fluid rejected in the condenser 222 is exchanged to affect heating, and evaporating a power fluid employed for the electric power co-generation system 230. The conditioned air supply fan 226, circulates the air of a building or alike, to remove its heat load through the evaporator coil 225.

The electric power co-generation system 230 consists of a power gas expander 231, employed to produce kinetic energy upon the expansion of the vapor of a power fluid, to a relatively lower pressure, and lower temperature levels. The expanded vapor flowing from the expander, then enters an air cooled condenser 233, where its residual latent heat is removed by the ambient cooling air. The condensate of the power fluid, then received in a liquid receiver accumulator 234, and recirculated back to the high pressure side of the power cycle through the liquid pump 235. The high pressure liquid of the power fluid is then directed through a non-return valve 236, and a pressure regulating valve 237, to enter the refrigerant condenser 222 of the air conditioning system, while the hot gas of the refrigeration fluid is desuperheated and condensed, the liquid power fluid is heated, and evaporated. The heated power fluid flowing from the condenser 222 is then directed to enter the engine fluid cooler 217 to remove the heat from the engine block, and from the exhaust gases, while the engine hot cooling fluid is cooled, the already heated power fluid flowing from the condenser 222, is further heated and evaporated to a superheat state. The superheated high pressure power fluid vapor, is then directed into a high pressure gas accumulator 238, and then released to drive the power gas expander 231. The power gas expander 231 is mechanically connected to the shaft of a permanent magnet, direct current generator 232. The electric power produced by generator 232 is transmitted in the electric wiring to a control panel 239. The control panel 239 includes a solid state voltage regulator, and frequency invertor to deliver the required electric power characteristics. The electric control circuit shall start-up the gas expander rotor upon reaching as desired pre-set pressure and temperature levels, other temperature, flow detection and pressure sensing and control devices are fitted to provide protection against excessive pressure and temperatures. The exhaust gas cooler 215 must be constructed of corrosion resistant materials to withstand the acidic water vapor condensate.

EXAMPLE

The following example is to demonstrate the merits of the present invention. It indicates a summary of estimated operating conditions, and performance for a gas engine driven cooling system using a waste heat driven ammonia vapor power system. It is understood that the presented information is based on certain particulars which may vary:

| I. GAS ENGINE BLOCK COOLING | |
|---|---|
| a. Gas specific fuel use, CF/TON | 10 |
| b. Fuel heat value, BTU/CF | 1,000 |
| c. Fuel specific thermal energy, BTU/TON | 10,000 |
| d. Air to fuel ratio | 10:1 |
| e. Fuel-air mixture inlet temperature, °F. | 70 |
| f. Exhaust gas temperature, °F. | 1,000 |
| g. Engine cooling water inlet temp, °F. | 180 |
| h. Engine cooling water outlet temp, °F. | 200 |
| i. Engine heat removed by water, BTU/TON | 4,000 |
| j. Cooling water mass flow rate, LB/TON | 200 |
| II. GAS ENGINE EXHAUST COOLING HEAT EXCHANGER | |
| a. Exhaust gas inlet temp, °F. | 1,000 |
| b. Exhaust gas outlet temp, °F. | 120 |
| c. Exhaust gas heat removed by cooling water, BTU/TON | 2,000 |
| d. Cooling water inlet temp, °F. | 200 |
| e. Cooling water outlet temp, °F. | 212 |
| III. COOLING SYSTEM CONDENSER | |
| a. System cooling capacity BTU/TON | 12,000 |
| b. Heat of compression BTU/TON | 2,400 |
| c. Heat removed in the condenser BTU/TON | 14,400 |
| d. Ammonia inlet temp °F. | 85 |

-continued

|   |   |   |
|---|---|---|
| e. Ammonia inlet pressure, PISA | 650 |  |
| f. Ammonia inlet enthalpy BTU/LB | 140 |  |
| g. Ammonia outlet temp, °F. | 180 |  |
| h. Ammonia outlet enthalpy BTU/LB | 500 |  |
| i. Heat absorbed by ammonia BTU/LB | 335 |  |
| IV. AMMONIA EVAPORATOR/WATER COOLING HEAT EXCHANGER |  |  |
| a. Cooling water inlet temp. °F. | 212 |  |
| b. Cooling water outlet temp. °F. | 180 |  |
| c. Heat absorbed by ammonia, BTU/TON | 6,000 |  |
| d. Ammonia inlet temp. °F. | 180 |  |
| e. Ammonia inlet pressure, PSIA | 650 |  |
| f. Ammonia inlet enthalpy, BTU/LB | 500 |  |
| g. Ammonia outlet temp. °F. | 200 |  |
| h. Ammonia outlet pressure, PSIA | 650 |  |
| i. Ammonia outlet enthalpy, BTU/LB | 650 |  |
| j. Heat absorbed by ammonia, BTU/LB | 150 |  |
| k. Ammonia main flow rate, LB/TON | 40 |  |
| V. AMMONIA GAS EXPANDER |  |  |
| a. Ammonia vapor inlet temp, °F. | 200 |  |
| b. Ammonia vapor inlet pressure, PSIA | 650 |  |
| c. Ammonia vapor inlet enthalpy, BTU/LB | 650 |  |
| d. Ammonia vapor outlet temp, °F. | 85 |  |
| e. Ammonia vapor outlet pressure, PSIA | 140 |  |
| f. Ammonia vapor outlet enthalpy, BTU/lb | 575 |  |
| g. Ammonia isentropic work done, BTU/lb | 75 |  |
| h. Ammonia isentropic work done, BTU/ton | 3,000 |  |
| i. Expander shaft work @ 80% isentropic efficiency, BTU/ton | 2,400 |  |
| j. Ammonia liquid pump work input, BTU/TON | 220 |  |
| k. Electric generator network input, BTU/TON | 2,180 |  |
| l. Electric generator net power output @ 85% generation & transmission, BTU/TON (KW/TON) | 1,853 (0.54) |  |

The example indicates that for each ton of cooling capacity, when the gas engine driven cooling system operates at the given working conditions, it uses 10 standard cubic feet of natural gas, and delivers 0.54 Kilowatt of electric power. The efficiency of the ammonia power cycle, and power produced by the ammonia gas expander will vary with the condensing temperature of the ammonia. The lower the ambient temperature, the lower the condensing temperature will be, and the higher the power produced by the gas expander. For example, if the condensing temperature drops down to 60° F., the power cycle efficiency will improve, and the system will deliver approximately 0.72 KW/hr, but if the condensing temperature rises up to 105° F., the power cycle efficiency will decrease, and the system will deliver only 0.40 KW/hr for each ton of its cooling capacity.

In conclusion, viewed from the issue of energy conservation, cost of electric power use, and cost of electric demand charges, the present invention employs a natural gas engine driven cooling system combined with an electric power co-generation system, where the waste heat energy usually rejected into the atmosphere, from the cooling heat cycle, and from the internal combustion engine heat cycle, is recovered and utilized to produce useful electric power. The use of the gas engine driven cooling system, and the co-generation of the electric power will coincide with the electric power peak demand periods. The present combined system is believed to be economically attractive in the sense that the energy utilization will exceed that delivered by prior art systems, and that the increased savings in the costs of the electric power use, and in the demand charges, will exceed the amortized capital costs in a relatively short period of time.

It is understood that the drawings, and the details of the embodiments of the present invention are shown schematically, and that for purpose of simplicity, the drawings do not indicate the prior art details necessary for the manufacture and proper operation of the system.

What claimed is:

1. In combination with a natural gas fueled engine driven liquid chiller system having a refrigerant vapor compressor, a refrigerant evaporator and a refrigerant condenser, wherein the improvement allows waste heat energy from an engine cooling fluid, an engine exhaust gas stream, and from the refrigerant condenser of said chiller system to be recovered and utilized to co-generate electric power, the improvement which comprises;

a natural gas fueled engine having an exhaust gas heat exchanger to exchange heat between the exhaust gas stream and the engine cooling fluid to affect cooling and condensing water vapor contained in said exhaust gas stream while heating said engine cooling fluid;

means to drain water vapor condensed in said exhaust gas heat exchanger;

said refrigerant vapor compressor having a power shaft directly connected to said natural gas fueled engine;

an evaporative power fluid contained in a closed thermal power circuit to recover heat energy from the refrigerant condenser of said chiller system and from said engine cooling fluid;

an evaporative heat exchanger to exchange heat between said engine cooling fluid and said evaporative power fluid to affect cooling the engine cooling fluid while heating and evaporating the power fluid to a power fluid vapor;

an engine cooling fluid circulating pump;

means to interconnect said engine cooling fluid circulating pump with said engine, said exhaust gas heat exchanger and said evaporative heat exchanger in a closed engine cooling circuit;

a high pressure vapor accumulator to receive the power fluid vapor from said evaporative heat exchanger;

a gas power expander to allow said power fluid vapor to expand from a relatively high pressure vapor to a lower pressure vapor;

a power fluid vapor condenser to condense the relatively lower pressure vapor from the gas power expander;

a power fluid liquid receiver to receive power fluid condensate from the said vapor condenser;

a power fluid liquid pump to pressurize and circulate the power fluid condensate back to said evaporative heat exchanger;

a control valve to regulate the rate of flow and pressure of said power fluid;

means to interconnect said gas power expander, the power fluid vapor condenser, the liquid receiver, the liquid pump, the control valve, the refrigerant condenser, and the evaporative heat exchanger in said closed thermal power circuit;

a direct current electric power generator directly connected to said gas power expander to co-generate electric power;

an electric power voltage regulator and inverter to regulate and deliver required electric power characteristics.

2. The method for generating electric power wherein a natural gas engine driven vapor compression chiller system having an electric power co-generation system, utilizes waste heat energy rejected from a refrigerant condenser of the chiller system, from residual heat of combustion absorbed by an engine cooling fluid and from an engine exhaust gas stream to evaporate a power fluid which in turn drives an electric generator to produce auxiliary electric power, the method which comprises;

exchanging the heat between a refrigerant and said power fluid in the refrigerant condenser of said chiller to affect desuperheating and condensing said refrigerant while heating said power fluid;

allowing the engine cooling fluid from said engine block to exchange heat with the exhaust gas stream in an exhaust gas heat exchanger to affect cooling of the exhaust gas while heating the engine cooling fluid to a relatively higher temperature;

directing the relatively higher temperature engine cooling fluid from said exhaust gas heat exchanger to an evaporative heat exchanger to allow cooling of the engine cooling fluid while evaporating the power fluid to a relatively high pressure vapor;

recirculating said engine cooling fluid from the evaporative heat exchanger back to the engine;

generating an electric current by allowing the relatively high pressure vapor of said power fluid to expand to a relatively lower pressure in a power gas expander to which drives a direct current electric power generator;

cooling and condensing the expanded relatively lower pressure vapor of said power fluid flowing from the gas expander;

pumping the condensate of said power fluid back to said evaporative heat exchanger;

transmitting the electric current generated;

controlling and regulating the generated electric power voltage, and current frequency.

* * * * *